United States Patent
Stahl et al.

(10) Patent No.: US 9,868,254 B2
(45) Date of Patent: Jan. 16, 2018

(54) METHOD AND APPARATUS FOR THREE DIMENSIONAL PRINTING OF COLORED OBJECTS

(71) Applicant: Apple Inc., Cupertino, CA (US)

(72) Inventors: Geoffrey Stahl, San Jose, CA (US); Howard A. Miller, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 611 days.

(21) Appl. No.: 14/292,670

(22) Filed: May 30, 2014

(65) Prior Publication Data

US 2015/0343704 A1 Dec. 3, 2015

(51) Int. Cl.
*B29C 67/00* (2017.01)
*B33Y 40/00* (2015.01)

(52) U.S. Cl.
CPC .......... *B29C 67/0059* (2013.01); *B33Y 40/00* (2014.12); *B29C 2795/007* (2013.01); *B29K 2995/0021* (2013.01)

(58) Field of Classification Search
CPC .......................... B29C 67/0059; B29C 67/0085
See application file for complete search history.

(56) References Cited

U.S. PATENT DOCUMENTS

| | | | | |
|---|---|---|---|---|
| 5,746,844 A * | 5/1998 | Sterett | ...................... | B22F 3/115 148/522 |
| 6,165,406 A * | 12/2000 | Jang | .................... | B29C 67/0081 264/308 |
| 6,504,559 B1 * | 1/2003 | Newton | ............... | B41M 5/0256 347/171 |
| 6,799,959 B1 * | 10/2004 | Tochimoto | .............. | B29C 41/12 425/130 |
| 7,604,768 B2 * | 10/2009 | Kritchman | .............. | B29C 41/02 264/308 |
| 8,883,392 B2 * | 11/2014 | Napadensky | ....... | B29C 67/0059 430/263 |
| 8,983,643 B2 * | 3/2015 | Heide | .................. | B29C 67/0055 345/441 |
| 2012/0261043 A1 * | 10/2012 | Yanoff | .................... | A63B 60/62 150/154 |
| 2012/0326356 A1 * | 12/2012 | Martin | ................... | G03B 21/62 264/401 |
| 2013/0147870 A1 * | 6/2013 | Yeh | ........................ | B41J 2/2117 347/15 |
| 2013/0295338 A1 * | 11/2013 | Keating | .............. | B29C 67/0055 428/174 |

* cited by examiner

*Primary Examiner* — Jacob T Minskey
*Assistant Examiner* — Melody Tsui
(74) *Attorney, Agent, or Firm* — Blank Rome LLP

(57) ABSTRACT

Systems, computer readable media, and methods for printing of 3D objects in color are disclosed. In general, a 3D object may be produced and colored by a 3D printer using the same digital 3D model. The digital model for a desired 3D object may be revised to include a process for coloring the object by the 3D printer. In one embodiment, this may involve coloring to the object after it has been made. In an alternative embodiment, color may be added as the object is being made. Because the 3D model provides knowledge of the surface, contours and all the coordinates of the 3D object being printed, the object can be colored using the same digital model.

18 Claims, 5 Drawing Sheets

METHOD AND APPARATUS FOR THREE DIMENSIONAL PRINTING OF COLORED OBJECTS

BACKGROUND

This disclosure relates generally to techniques for three dimensional (3D) printing of objects. More particularly, the disclosure relates to improved techniques for efficiently producing versatile objects with a 3D printer.

3D printing is a process of making a 3D solid object of almost any desired shape from a digital model. Objects are generally made in 3D printing by using a process where successive layers of a desired material such as plastic or a type of metal are laid down in different shapes. In practice, a 3D printer may be a type of computer numerical control (CNC) that is capable of carrying out an additive process under computer control.

While 3D printing technology has been around for many years, it has not until recent years that the printers have become widely available commercially. As a result of their wide availability, applications for 3D printing have been extended to architecture, construction, automotive, engineering, dental and medical industries. To extend the use of 3D printers to more industries and encourage more household use, it may be desirable to improve the 3D printing technology to make objects that are more versatile and useful to an everyday consumer.

SUMMARY

In one embodiment a non-transitory program storage device, readable by a processor is provided. The non-transitory program storage device includes instructions stored thereon to cause one or more processors to receive a 3D information file, where the 3D information file is associated with a 3D printable object for production using a 3D printing apparatus. The 3D information file also describes the 3D printable object in three dimensions. The non-transitory program storage device also includes instructions stored thereon to cause one or more processors to develop a detailed process to apply color to the 3D printable object and to create a machine readable code sequence for use by the 3D printing apparatus to apply color to the 3D printable object based on the detailed process.

In another embodiment, an apparatus is provided which includes a platform for holding a 3D printable object during a 3D printing process. The apparatus also includes a 3D print head for moving in cooperation with the platform in order to deposit 3D printable material according to a 3D information file that describes a 3D printable object in three dimensions, and a color application head for moving in cooperation with the 3D print head and the platform and for applying color to the surface of the 3D printable object.

In yet another embodiment, a computer implemented method of printing a custom manufactured object is provided. The method includes reading a 3D information file from a memory, where the 3D information file is associated with a 3D printable object for production using a 3D printing apparatus and the 3D information file describes the 3D printable object in three dimensions. The method also includes developing a detailed process to apply color to the 3D printable object, and creating a machine readable code sequence for use by the 3D printing apparatus to apply color to the 3D printable object based on the detailed process.

DETAILED DESCRIPTION

Figure 1:
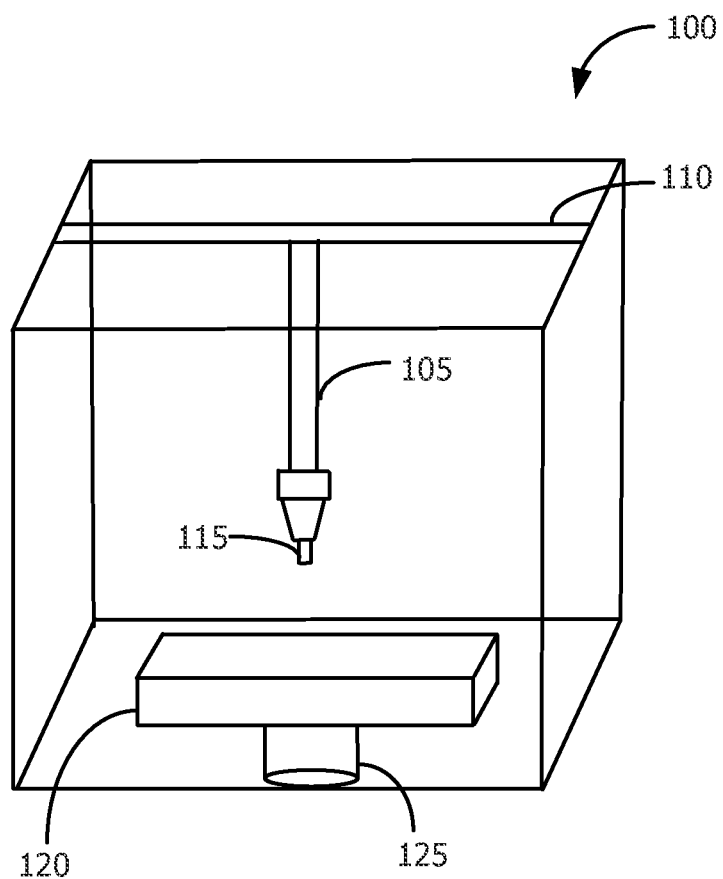
FIG. 1 illustrates a prior art 3D printer for printing 3D objects, in accordance with one embodiment.

This disclosure pertains to systems, computer readable media, and methods for printing of 3D objects in color. In general, a 3D object may be produced and colored by a 3D printer using the same digital model. The digital model for a desired 3D object may be revised to include a process for coloring the object by the 3D printer. In one embodiment, this may involve coloring the object after it has been made. In an alternative embodiment, color may be added as the object is being made. Because the 3D model provides knowledge of the surface, contours and all the coordinates of the 3D object being printed, the object can be colored using the same digital model. Moreover, a color application head can be kept normal to the surface for coloring the object, while the print head may move around to print the object in an efficient manner. By using the same digital model to add color to the object during printing, objects could be made in a variety of colors. For example, an object may include multiple colors with each part being of a different color.

The most common way prior art 3D printers produce objects in color, is to use colored materials. This means that in general objects can only be printed in one color, as it is not practical to change materials while printing. Moreover, the use of colored materials limits the number of colors an object may be printed on. Furthermore, use of multiple colored materials may be expensive and impractical. Thus, an efficient inexpensive process is needed to color 3D objects while they are printed by a 3D printer.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and timeconsuming, but would nevertheless be a routine undertaking for those of ordinary skill in the art of data processing having the benefit of this disclosure.

Referring to FIG. 1, a prior art 3D printer 100 is shown. 3D printer 100 may include a print head controller 105 connected to a support bar 110. Print head controller 105 may carry a 3D print head 115 for printing a 3D object. Print head controller 105 may be movable in one or more directions, thus controlling the movements of 3D print head 115. A platform 120 may be positioned on a support structure 125 to provide a surface upon which a 3D object may be fabricated.

Print head controller 105 may be programmed to be moved along an X-axis and a Y-axis by a positioning system (not shown). For example, print head controller 105 may slide on support bar 110 to move in the X-axis. In one embodiment, side support bars (not shown) may be connected to support bar 110 and may be movable in the Y-axis to move support bar 110 and thus print head controller 105 in the Y direction. Print head controller 105 may also be programmed to be moved along a Z-axis when needed to create custom 3D objects. Alternatively, platform 120 may be movable in one or more of the X, Y, and Z axes when needed to create a desired 3D object. In one embodiment, support structure 125 may be moved in one or more directions to control the movements of platform 120. In general, either print head controller 105 or platform 120 may be movable in each one of the three axes in coordination to enable 3D printing of an object. Movements of print head controller 105 and platform 120 may be directed a computer (not shown) with which the 3D printer 100 is in communication (either wired or wirelessly). The computer may direct the movements through a digital model of the 3D object being printed. The digital model may be a 3D information file describing the 3D printable object in three dimensions.

To create a 3D object, print head 115 may shoot droplets of a liquid-to-solid material such as plastic on the top surface of platform 120. 3D objects are generally created in this manner layer by layer. Programmed movement of print head 115 and/or platform 120 while the material is being dropped on the top surface of platform 120 may result in a first layer of the 3D object of a desired shape. Additional layers of the material may then be dropped layer by layer to eventually create a complete 3D object.

Objects created by this process generally lack color, as coloring is not a part of this process. At the most, the objects may be made in one color if the material being dropped on the surface is a colored material. This limits the range of useful objects a 3D printer can make, as most everyday objects contain multiple colors. To add versatility to objects created by a 3D printer, a process may be used that efficiently adds color to 3D objects as part of the 3D printing process.

Figure 2A:
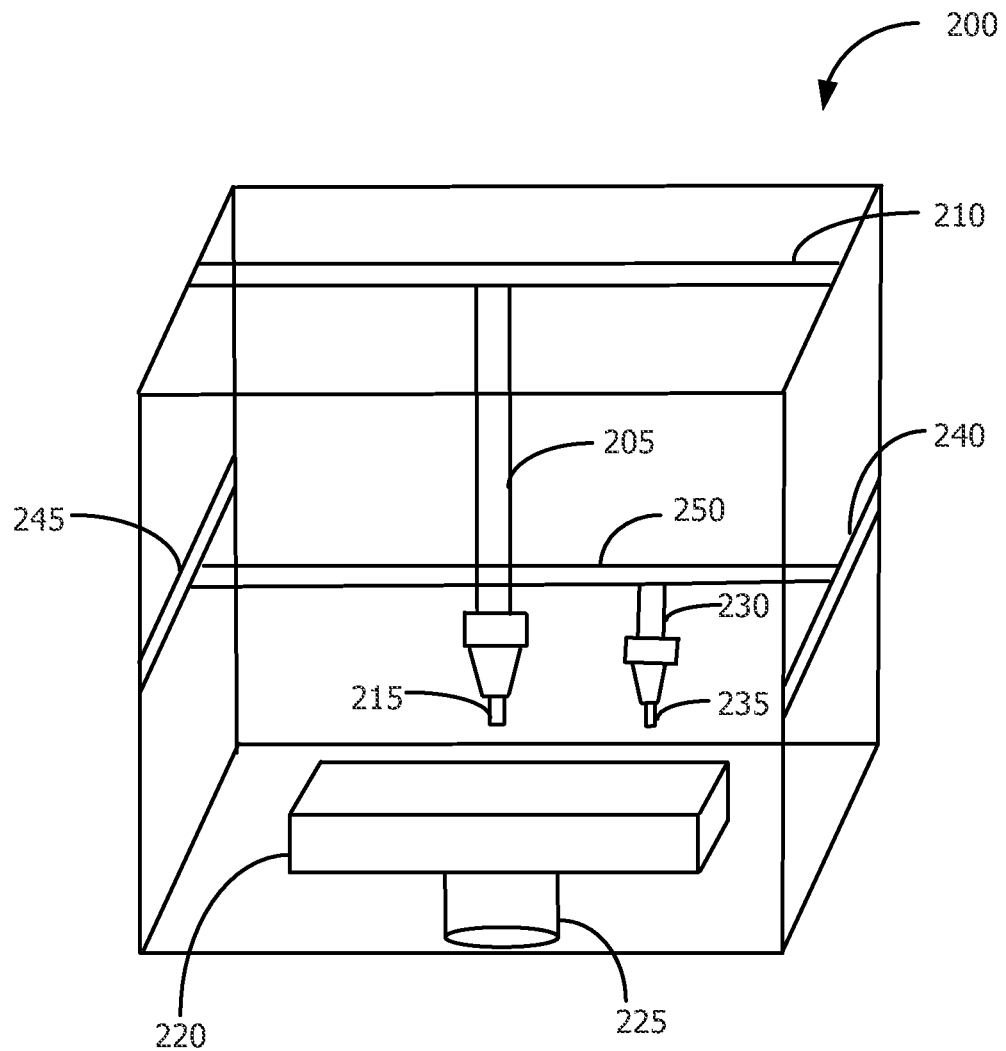
FIGS. 2A-2B illustrate improved 3D printers for printing and coloring 3D objects, in accordance with one embodiment.

In one embodiment, an improved 3D printer 200 is shown in FIG. 2A. The improved 3D printer 200 may include a first print head controller 205 which carries a print head 215 and may be supported by a support bar 210. The improved 3D printer 200 may also include a color application head controller 230 which carries a 3D color application head 235. As shown, 3D color application head 235 may be positioned in parallel to print head 215. Color application head controller 230 may be supported by a support bar 250 which is connected to side bars 240 and 245. In one embodiment, support bar 250 and side bars 240 and 245 may help in controlling the movements of print head controller 230. In an alternative embodiment, first print head controller 205 and color application head controller 230 may be supported by the same support bars. 3D printer 200 may also include a platform 220, which may be positioned on a support structure 225 to provide a surface upon which a 3D object may be fabricated and colored. Platform 220 may hold the 3D object during the 3D printing and coloring process.

Each of first print head controller 205 and second print head controllers 230 may be programmed to move along an X-axis, a Y-axis, and/or a Z-axis by a positioning system (not shown). For example, first print head controller 205 may slide on support bar 210 to move in the X-axis and second print head controller 230 may slide on support bar 250. In one embodiment, side support bars similar to side support bars 240 and 245 (not shown) may be connected to support bar 210 and may be movable in the Y-axis to move the support bar 210 and thus first print head controller 205 in the Y-direction. Side support bars 240 and 245 may help move second print head controller 230 in the Y-direction. Additionally, platform 220 may be movable in coordination with first print head controller 205 and second print head controller 230 in one or more of the X, Y, and Z axes, when needed to create a desired 3D object in color. In one embodiment, support structure 225 may be moved in one or more directions to control the movements of platform 220. Movements of print head controllers 205 and 230 and platform 220 may be controlled by a digital model accessed through a computer (not shown) with which the 3D printer 200 is in communication (either wired or wirelessly).

Print head 215 may operate in a similar manner as print head 115 of FIG. 1, in that it may shoot droplets of a liquid-to-solid material such as plastic on platform 220 to create a 3D object. Color application head 235, on the other hand, is configured to apply color to the 3D object being created. In one embodiment, color application head 235 may include a spray nozzle for spraying paint on the 3D object being created by print head 215. In another embodiment, color application head 235 may be an airbrush that sprays color. Alternatively, color application head 235 may be an inkjet print head for applying colored ink to the 3D object. In yet another embodiment, color application head 235 may be a permanent marker having a spring head which is capable of applying permanent color in different shades to the 3D object.

Movements of color application head 235 may be controlled by second print head controller 230 which is in turn controlled by the same digital model that controls the movements of first print head controller 205. The digital model may also control which color to choose for each portion or each layer of the 3D object. As discussed above, second print head controller 230 may be movable in multiple directions, thus providing a multi-axis color application head 235.

In one embodiment, while print head 215 discards drops of material on the top surface of platform 220 to create a 3D object, color application head 235 may add color to the materials dropped on the surface. This may be done in one embodiment in layers. For example, print head 215 may drop one or more layers of material on the top surface, and move up and out of the way of color application head 235 to enable the color application head 235 to add color to the one or more layers dropped. This process may be repeated until the 3D object is created and completely colored. In one embodiment, instead of print head 215 moving up after it has finished laying out the last layers, platform 220 may move down to allow color application head 235 access to the 3D object to add color. In another embodiment, print head 215 may create the whole 3D object before moving out of the way of color application head 235 (or before platform 220 moves down), at which point color application head 235 can add color to the created object.

Adding color in this manner may be possible because through the 3D digital model, color application head 235 is aware of all coordinates of the 3D object as it is being built and once is it complete. Thus, adding colors to specific corners and surfaces of the 3D object is easily achievable. In one embodiment, this process allows print head 215 to remain in a direction normal to the top surface of platform 220 and thus normal to the 3D object being created. Alternatively, print head 215 may move around in various angles to the 3D object, while the color application head 235 is positioned in an angle normal to the 3D object.

Figure 2B:
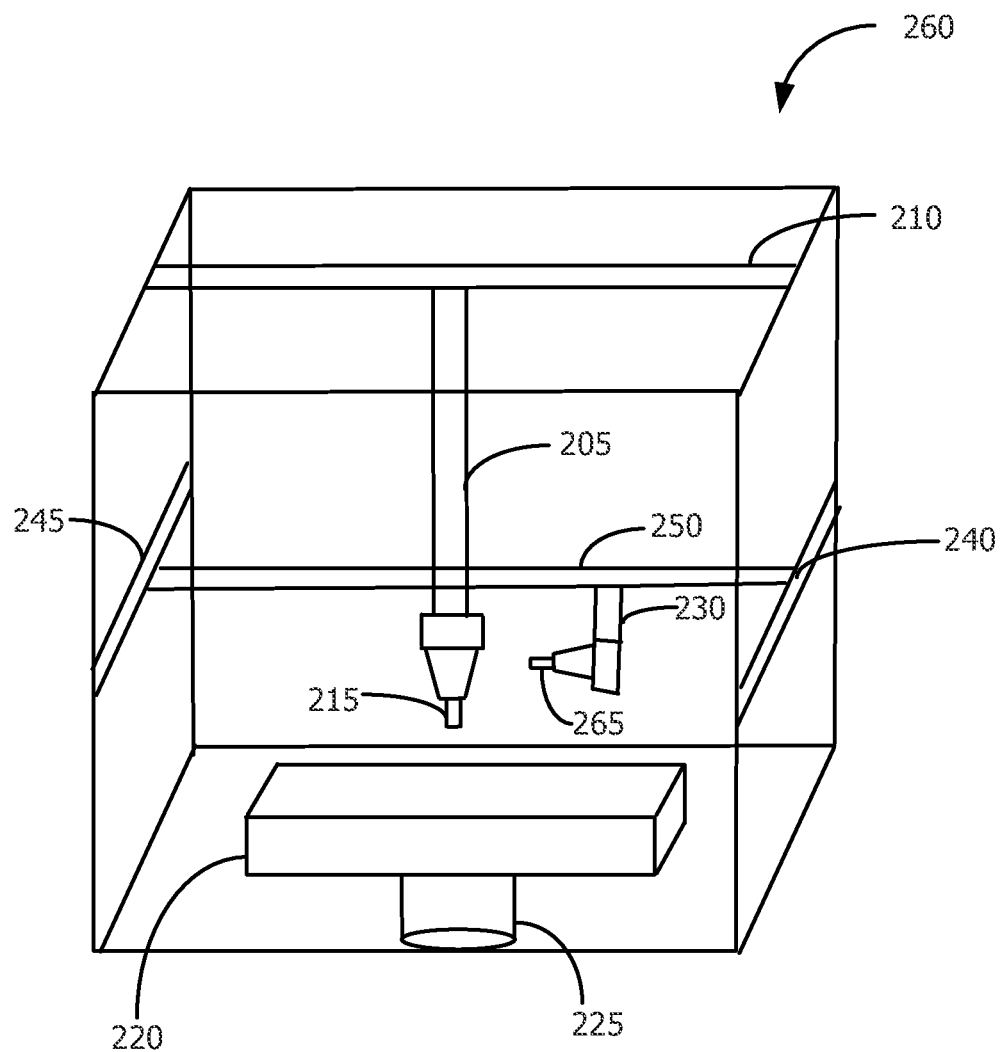

Referring to FIG. 2B, an alternative improved 3D printer 260 is shown. 3D printer 260 may include almost all of the same components as 3D printer 200, except for color application head 265 which in this case may include a rotatable nozzle. In one embodiment, the rotatable nozzle may able to rotate 360 degrees, thus enabling color application head 265 to move around print head 215. This may enable print head 215 and color application head 265 to work at the same time, thus increasing efficiency of the process. This may work, for example, such that when print head 215 is adding layers to the top of the 3D object, color application head 265 may be adding color to lower layers of the 3D object. Alternatively, both print head 215 and color application head 265 can work on the same layers at the same time.

Figure 3:
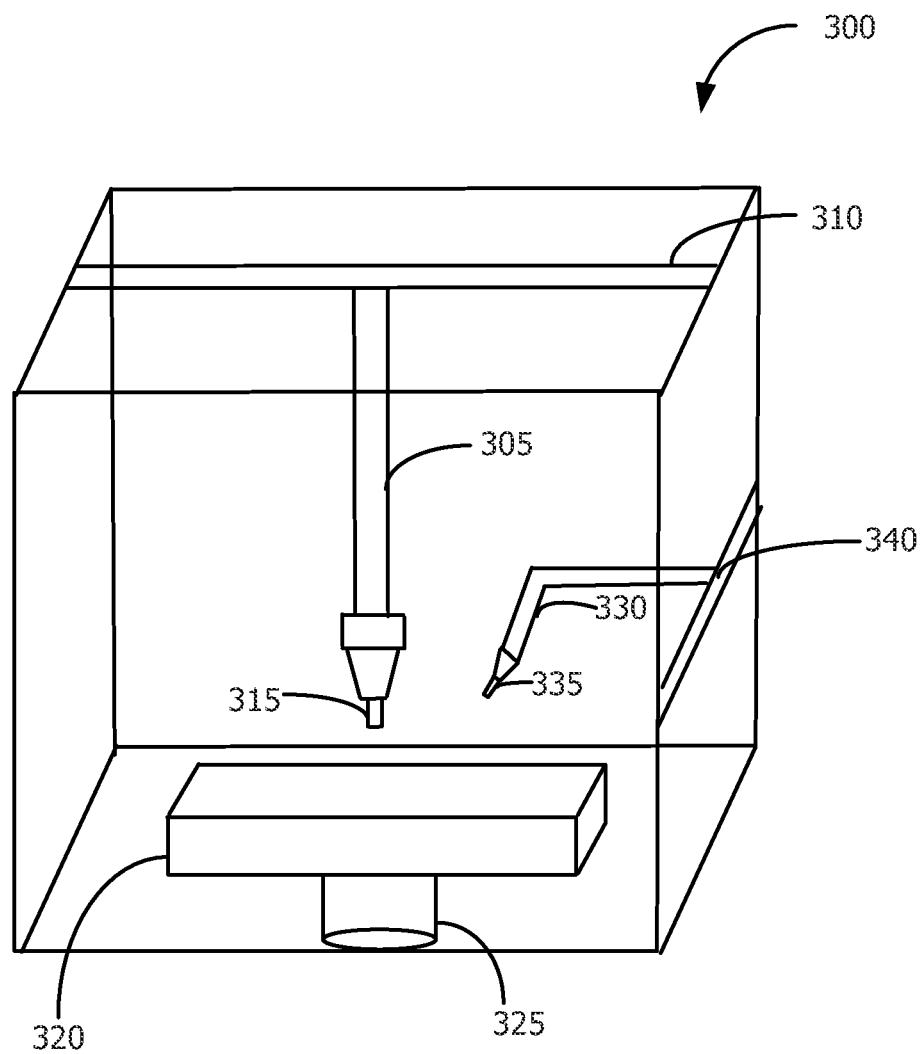
FIG. 3 illustrates an alternative improved 3D printer for printing and coloring 3D objects, in accordance with one embodiment.

Referring to FIG. 3, an improved 3D printer 300 having an alternative color application head controller 330 is shown. In general, 3D printer 300 includes similar components as those of 3D printer 200 of FIG. 2A. Support bar 310, first print head controller 305, print head 315, platform 320, support structure 325 and side bar 340 all function in a similar manner as those of their correspondingly similar components in 3D printer 200. However, second print head controller 330 of 3D printer 300 may be different than second print head controller 230 in that second print head controller 330 may be an articulated arm capable of moving in multiple directions. In one embodiment, second print head controller 330 is a robotic articulated arm. By being able to move in multiple directions, second print head controller 330 may move color application head 335 around the first print head 315 to add color to the 3D object as it is being printed by first print head 315.

In one embodiment, first print head controller 305 may also be an articulated arm. In such an embodiment, the movements of both print head controllers 305 and 330 may be coordinated by the digital model such that both move and function at the same time, while they each avoid interfering with the other controller's movements and functions. In another embodiment, color application head 335 may be a rotatable nozzle, adding more flexibility to the movements of the color application head 335.

In one embodiment, side bar 340 may not be movable and may only be used as a mean for providing support to second print head controller 330. In one configuration, when first print head controller 305 is a robotic arm, color application head 335 may also be connected to the first print head controller 305, thus eliminating the need for a second print head controller. In such an embodiment, first print head 315 and color application head 335 may be positioned in the same angle with respect to the top surface of platform 320. Alternatively, color application head 335 may be positioned in a different angle. In one embodiment, color application head 335 may be a rotatable nozzle.

An alternative embodiment to the 3D printer 300, may involve a rotatable platform. The platform may be rotatable such that a color application head located radially to the top surface of the platform can add color to various parts of the 3D object located on the top surface. Such an embodiment may involve printing a 3D object or at least some layers of the 3D object first by the print head, moving the print head out of the way, and then rotating the platform to locate the 3D object in a location accessible to the color application head which would then add color to the 3D object.

In one embodiment, the improved 3D printer may also include a mechanism by which the 3D object being printed can be sanded, buffed, and/or finished before color is added. This can may done, in one embodiment, by printing the 3D object, and then removing it from the platform after it has been completely printed so that it can be finished or sanded by any well-known procedure used for finishing such an object. In such a case, the 3D digital model may be designed or reprocessed such that the step of finishing the object may be taken into account. In an Alternative embodiment, the 3D printer itself may include a mechanism by which the object can be finished. This may include having a separate articulated arm that can finish or sand the object. The finishing step may be done by correcting any roughness or imperfections detected in the object. The imperfections may be detected by comparing the built object with the numerical representations provided in the 3D digital model to see if there are any areas where the two do not match. Once the imperfections are detected, the 3D model may control the separate articulated arm to sand the object. Alternatively, a removable tool for sanding the object may be used. In such a case, either one or both of the print head or the color application heads may also include a removable tool for printing or adding color. Once printing is done, the print head may be changed with the removable sanding tool for sanding the object. Alternatively, the second print head controller 330 may first be connected to a removable tool for sanding. In such a case, after the object is printed by the print head 315, the sanding head may sand the object, and then the sanding head may be changed with the color application head 335 for coloring. Whether a separate articulated arm or a changeable tool is used for finishing and sanding the object, the procedure for performing the finishing operation may be included in the 3D model. Alternatively, the 3D model may be reprocessed to include the procedure.

Figure 4:
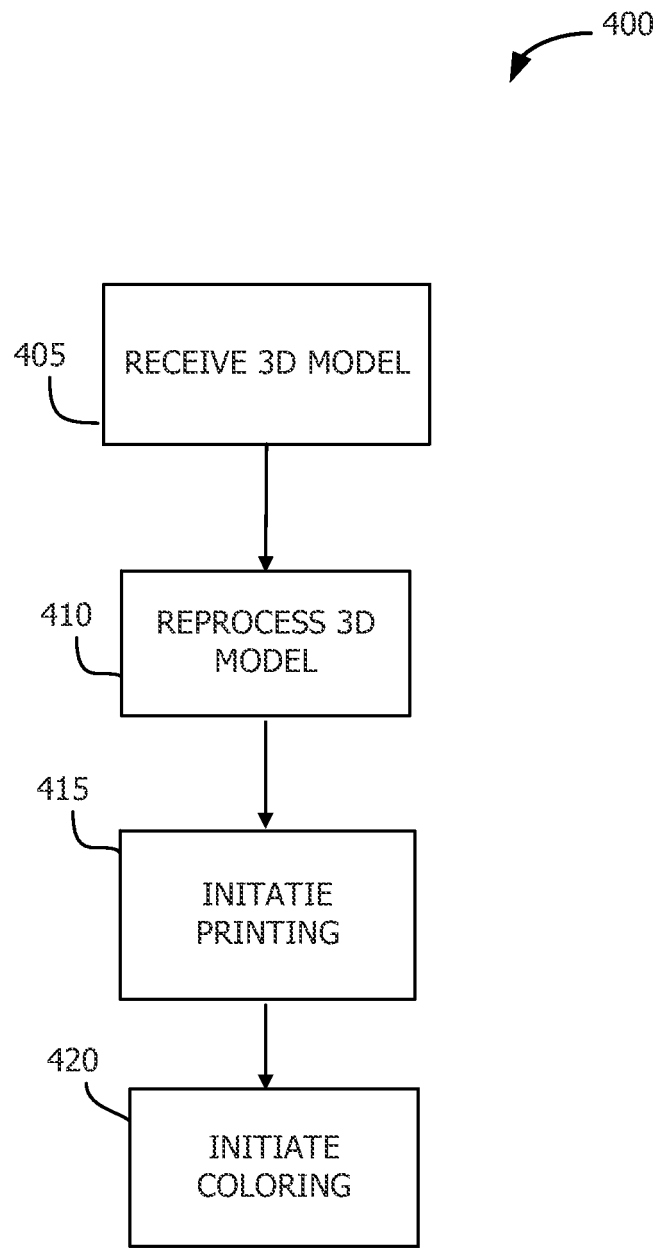
FIG. 4 is a flowchart for printing and coloring a 3D object using a 3D digital model, in accordance with one embodiment.

Referring to FIG. 4, in accordance with one embodiment, operation 400 for printing and coloring a 3D object begins by receiving a 3D digital mode (block 405). The 3D digital model may generally be received by a computer in communication with the 3D printer. The 3D digital model is generally an information file describing a 3D printable object in three dimensions. In one embodiment, this 3D model may be reprocessed to develop a detailed process for adding color to the 3D printable object (block 410). This may be done by texture mapping the 3D model. Because the 3D model already contains all the surface coordinates of the 3D object, texture mapping the model to add color is easily achievable. Thus, by knowing the exact location of the printed material, a process can be conceived to control coloring the printed object with high accuracy. Accordingly, by using the same digital file and input structure, a detailed process may be devised to create a colored 3D object. After the detailed process is developed, a machine readable code sequence for use by a 3D printer to perform the process may be created. This may be done by a software program designed to automatically reprocess the 3D model for coloring. In one embodiment, the software program may be the same program used to create the 3D model. Alternatively, a different software program may be used. The software program may provide input screens for a user to customize coloring of the 3D object. For example, the user may be able to choose various colors for different parts of the 3D object being printed.

In one embodiment, the process of adding color to the 3D object may affect the printing process. For example, the printer may need to color some areas of the 3D object that may become difficult to access later, before more layers are printed. In such a case, the software program may revise the 3D printing process to take into account the coloring process. Thus the resultant reprocessed model includes a process for printing and coloring the 3D object that takes into account various parameters including the relative position and orientation of the print head and the color application head and how they need to interact with each other to prevent interference.

An alternative to reprocessing the 3D model may involve receiving a 3D digital model which already includes a process for coloring, in which case reprocessing the model may not be necessary.

After the model is determined to be ready for both printing and coloring, printing of the 3D object may be initiated (block 415). This may be done, in one embodiment, by a user making a selection directly on the 3D printer or selecting an option from a user interface provided by the computer. The machine readable code sequence may then be communicated to the 3D printer which may load the code sequence, and initiate the printing process accordingly. Once one or more layers of the 3D object have been printed, coloring may be initiated (420) in accordance with the process devised by the reprocessed 3D model. This may be done, in one embodiment, by using the same 3D model and printing and coloring either intermittently or at the same time. Alternatively, coloring may be done after the 3D object has been created. In such an instance, the 3D model or a version thereof which includes the coloring process may be loaded again by the 3D printer for coloring.

Using this process, a 3D object which includes multiple colors can be created efficiency. This increases versatility of objects that can be printed by a 3D printer and extends the use to more everyday objects. For example, toys could be printed using such a printer at home. In one application, 3D models that include color can be sold by companies, enabling everyday consumers to create their own objects at home. For example, 3D models of toy characters can be made available for purchase by consumers.

It should be noted that the computer referred to above may be any electronic device that is capable of receiving and processing a 3D digital model and communicating with a 3D printer. For example, the computer could be a personal digital assistant (PDA), mobile telephone, server, notebook, laptop, desktop, or tablet computer. It should also be noted that a 3D printer may include various other known components that have been not been discussed.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art. For example, some of the disclosed embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
   receive a 3D information file having data representative of a 3D printable object for production using a 3D printing apparatus;
   update the 3D information file to include color information for the 3D printable object;
   update the 3D information file to account for performing a finishing operation prior to applying color when producing the 3D printable object, wherein the finishing operation applies finishing to correct imperfections detected between a produced 3D printed object and the 3D printable object;
   create a machine readable code sequence that is executable by the 3D printing apparatus based on the updated 3D information file that includes the color information and accounts for performing the finishing operation; and
   determine whether the produced 3D printed object matches the 3D printable object.

2. The non-transitory program storage device of claim 1, wherein the instructions that cause the one or more processors to update the 3D information file to include color information comprise instructions that cause the one or more processors to include information that accounts for alternating between printing 3D material and applying color to a surface of previously printed 3D material.

3. The non-transitory program storage device of claim 1, wherein the instructions that cause the one or more processors to update the 3D information file to include color information comprise instructions that cause the one or more processors to include information that accounts for applying color to a surface of previously printed 3D material while more 3D material is being printed.

4. The non-transitory program storage device of claim 1, wherein the instructions that cause the one or more processors to update the 3D information file to include color information comprise instructions that cause the one or more processors to include information that accounts for applying color to a surface of the 3D printable object after the 3D printable object has been produced.

5. The non-transitory program storage device of claim 1, wherein the instructions that cause the one or more processors to update the 3D information file to include color information comprise instructions that cause the one or more processors to implement a texture mapping of the 3D printable object to add the color information.

6. The non-transitory program storage device of claim 5, wherein the 3D information file includes surface coordinates, and wherein the instructions that causes the one or more processors to implement a texture mapping comprise instructions that cause the one or more processors to implement the texture mapping based on the surface coordinates.

7. The non-transitory program storage device of claim 1, wherein the instructions that cause the one or more processors to update the 3D information file to include color information comprise instructions that cause the one or more processors to revise the 3D information file to account for interaction and interference between a print head of the 3D printing apparatus and a color application head of the 3D printing apparatus.

8. The non-transitory program storage device of claim 1, wherein the instructions that cause the one or more processors to update the 3D information file to include color information comprise instructions that cause the one or more processors to revise the 3D information file to account for a plurality of color parameters that include relative position and orientation of a print head of the 3D printing apparatus and a color application head of the 3D printing apparatus.

9. The non-transitory program storage device of claim 1, wherein the finishing operation includes sanding, buffing, or both by the 3D printing apparatus to remove one or more detected imperfections between the produced 3D printed object and the 3D printable object.

10. An apparatus, comprising:
at least one processor;
memory coupled to the at least one processor and having instructions stored thereon to cause the at least one processor to:
receive a 3D information file having data representative of a 3D printable object for production using a 3D printing apparatus;
update the 3D information file to include color information for the 3D printable object;
update the 3D information file to account for performing a finishing operation prior to applying color during the production of the 3D printable object, wherein the finishing operation includes sanding, buffing, or both by the 3D printing apparatus to remove one or more detected imperfections between a produced 3D printable object and the 3D printable object; and
create a machine readable code sequence that is executable by the 3D printing apparatus based on the updated 3D information file that includes the color information and accounts for performing the finishing operation.

11. The apparatus of claim 10, wherein the instructions that cause the at least one processor to update the 3D information file to include color information comprise instructions that cause the at least one processor to include information that accounts for alternating between printing 3D material and applying color to a surface of previously printed 3D material.

12. The apparatus of claim 10, wherein the instructions that cause the at least one processor to update the 3D information file to include color information comprise instructions that cause the at least one processor to include information that accounts for applying color to a surface of previously printed 3D material while more 3D material is being printed.

13. The apparatus of claim 10, wherein the instructions that cause the at least one processor to update the 3D information file to include color information comprise instructions that cause the at least one processor to include information that accounts for applying color to a surface of the 3D printable object after producing the 3D printable object.

14. The apparatus of claim 10, wherein the instructions that cause the at least one processor to update the 3D information file to include color information comprise instructions that cause the at least one processor to implement a texture mapping of the 3D printable object to add the color information.

15. The apparatus of claim 14, wherein the 3D information file includes surface coordinates, and wherein the instructions to implement a texture mapping comprise instructions that cause the at least one processor to implement the texture mapping based on the surface coordinates.

16. The apparatus of claim 10, wherein the instructions that cause the at least one processor to update the 3D information file to include color information comprise instructions that cause the at least one processor to revise the 3D information file to account for interaction and interference between a print head of the 3D printing apparatus and a color application head of the 3D printing apparatus.

17. The apparatus of claim 10, wherein the instructions that cause the at least one processor to update the 3D information file to include color information comprise instructions that cause the at least one processor to revise the 3D information file to account for a plurality of color parameters that include relative position and orientation of a print head of the 3D printing apparatus and a color application head of the 3D printing apparatus.

18. The apparatus of claim 10, wherein the instructions further cause the at least one processor to determine whether a produced 3D printable object matches the 3D printable object, wherein the machine readable code sequence includes instructions to apply finishing to correct imperfections detected in the produced 3D printable object.

* * * * *

UNITED STATES PATENT AND TRADEMARK OFFICE
CERTIFICATE OF CORRECTION

| | |
|---|---|
| PATENT NO. | : 9,868,254 B2 |
| APPLICATION NO. | : 14/292670 |
| DATED | : January 16, 2018 |
| INVENTOR(S) | : Geoffrey Stahl et al. |

It is certified that error appears in the above-identified patent and that said Letters Patent is hereby corrected as shown below:

In the Claims

Claim number 6, at Column 8, Line numbers 59-60, "that causes the one or more processors" should be changed to -- that cause the one or more processors --

Signed and Sealed this
Fifth Day of June, 2018

Andrei Iancu
*Director of the United States Patent and Trademark Office*